(12) United States Patent
Terao

(10) Patent No.: US 6,256,402 B1
(45) Date of Patent: Jul. 3, 2001

(54) PASSWORD INPUT APPARATUS BASED ON FINGERPRINT RECOGNITION OF A REGISTERED USER OF A SYSTEM

(75) Inventor: Masayuki Terao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/130,219

(22) Filed: Aug. 6, 1998

(30) Foreign Application Priority Data

Aug. 7, 1997 (JP) .................................................... 9-225710

(51) Int. Cl.[7] .............................. G06K 9/00; G06K 9/78; H04B 1/00
(52) U.S. Cl. ......................... 382/125; 382/125; 382/124; 340/5.52
(58) Field of Search ............................. 713/202; 382/124, 382/125; 356/71; 235/380; 705/18; 340/5.52; 345/163

(56) References Cited

U.S. PATENT DOCUMENTS

| | | | |
|---|---|---|---|
| 4,471,216 | * | 9/1984 | Herve .................................... 235/380 |
| 4,728,186 | * | 3/1988 | Eguchi et al. .......................... 356/71 |
| 5,144,680 | * | 9/1992 | Kobayashi et al. ................... 382/124 |
| 5,493,621 | * | 2/1996 | Matsumura .......................... 382/125 |
| 5,812,764 | * | 9/1998 | Heinz, Sr. ............................. 713/202 |

OTHER PUBLICATIONS

Abstract of Japanese Patent Application, First Publication No. 4–111038 dated Apr. 13, 1992.
Abstract of Japanese Patent Application, First Publication No. 7–234837.
Abstract of Japanese Patent Application, First Publication, No. 6–102958 dated Apr. 15, 1994.
Abstract of Japanese Patent Application, First Publication, No. 2–267663 dated Nov. 1, 1990.

* cited by examiner

Primary Examiner—Daniel H. Pan
Assistant Examiner—Te Yu Chen
(74) Attorney, Agent, or Firm—Scully, Scott Murphy & Presser

(57) ABSTRACT

The password input apparatus of the present invention comprises: a database for storing feature data of a previously registered master fingerprint and a password of an authorized user in a related manner; a camera for obtaining a fingerprint being inputted from the user's finger; an extractor for extracting feature data of the fingerprint; a controller for reading the password from the database based on the feature data extracted by the extractor; and an interface for outputting the password to another device.

7 Claims, 3 Drawing Sheets

PASSWORD INPUT APPARATUS BASED ON FINGERPRINT RECOGNITION OF A REGISTERED USER OF A SYSTEM

FIELD OF THE INVENTION

The present invention relates to a password input apparatus, and in particular to a password input apparatus for securing a computer or a computer network.

This application is based on Japanese Patent Application No. Hei 9-225710, the contents of which are incorporated herein by reference.

BACKGROUND ART

A password verification system which comprises a mouse tablet having a reading device for obtaining a fingerprint, a data storage device for registering data of the obtained fingerprint, a microprocessor for comparing data later inputted with the data registered in the data storage device, a display for displaying the obtained fingerprint and the comparison result, and a keyboard as an input means, has been proposed (in the Japanese Patent Application, First Publication No. Hei 4-111038).

The password verification system uses a fingerprint being input to the mouse tablet as a password, thereby preventing trouble due to the password being forgotten or leaked.

A disadvantage of the prior password verification system is that it does not use existing resources, and therefore it is difficult for its use to become widespread. That is, the system which manages a fingerprint as a password is not compatible with other systems in use. When the prior system is introduced with a computer application program and a periphery device, the computer application program is necessarily supplemented or modified in order to communicate with the application program, so that the application program operating in the computer can employ the password verification system.

Another disadvantage is that the prior password verification system can handle user verification only at local systems, because the prior system managing a fingerprint as a password cannot be applied to a number of different systems through a network although it can be applied for verification for a local user.

SUMMARY OF THE INVENTION

It is therefore an object of the present invention to provide a password input apparatus compatible with existing systems and applicable to a number of different systems through a network while maintaining an advantage of preventing trouble due to the password being forgotten or leaked.

In order to accomplish the above object, a password input apparatus of the present invention comprises: a database for storing feature data of a previously registered fingerprint and a password of an authorized user in a related manner; a camera for obtaining a fingerprint being inputted from the user's finger; an extractor for extracting feature data of the fingerprint; a controller for reading the password from the database based on the feature data extracted by the extractor; and an interface for outputting the password to another device.

In another aspect of the present invention, a password input apparatus according to claim 1, further comprises: a registration commander for requiring registration of a new password; and a random code generator for generating a random code as a new password when commanded by the registration command device, wherein the controller stores the new password and the feature data extracted by the extractor in a related manner to each other in the database when registration is commanded by the registration commander, the controller reading the password from the database based on the feature data extracted by the extractor when registration is not commanded by the registration commander.

An advantage of the present invention is that the apparatus is compatible with the existing systems and can be introduced at low costs. That is, the apparatus can be easily connected to a host device because the present apparatus uses a code password generated at random in accordance with the features of the fingerprint, and modification of the software in the host device is unnecessary because the present apparatus sends a user input which was sent from a keyboard in the prior art.

Another advantage of the present invention is that the apparatus is easily applied to user verification between a number of different systems through a network. That is, modification of software in host devices is unnecessary because the apparatus uses the code password generated at random in accordance with feature data of the fingerprint.

In another aspect of the present invention, the interface outputs the password when the fingerprint matches with the previously registered master fingerprint. The database stores a plurality of passwords for one authorized user in generation order. A password input apparatus further comprises a selection means for selecting one of the passwords. The interface is a keyboard interface connected between a keyboard and the device. The interface may be a USB interface.

BRIEF DESCRIPTION OF THE DRAWINGS

FIG. 4 is a diagram showing examples of feature data and passwords registered in a database of FIG. 3.

DETAILED DESCRIPTION OF THE PREFERRED EMBODIMENTS

The best mode of the password input apparatus, according to an embodiment of the present invention, will be explained with reference to Figures.

Figure 1:
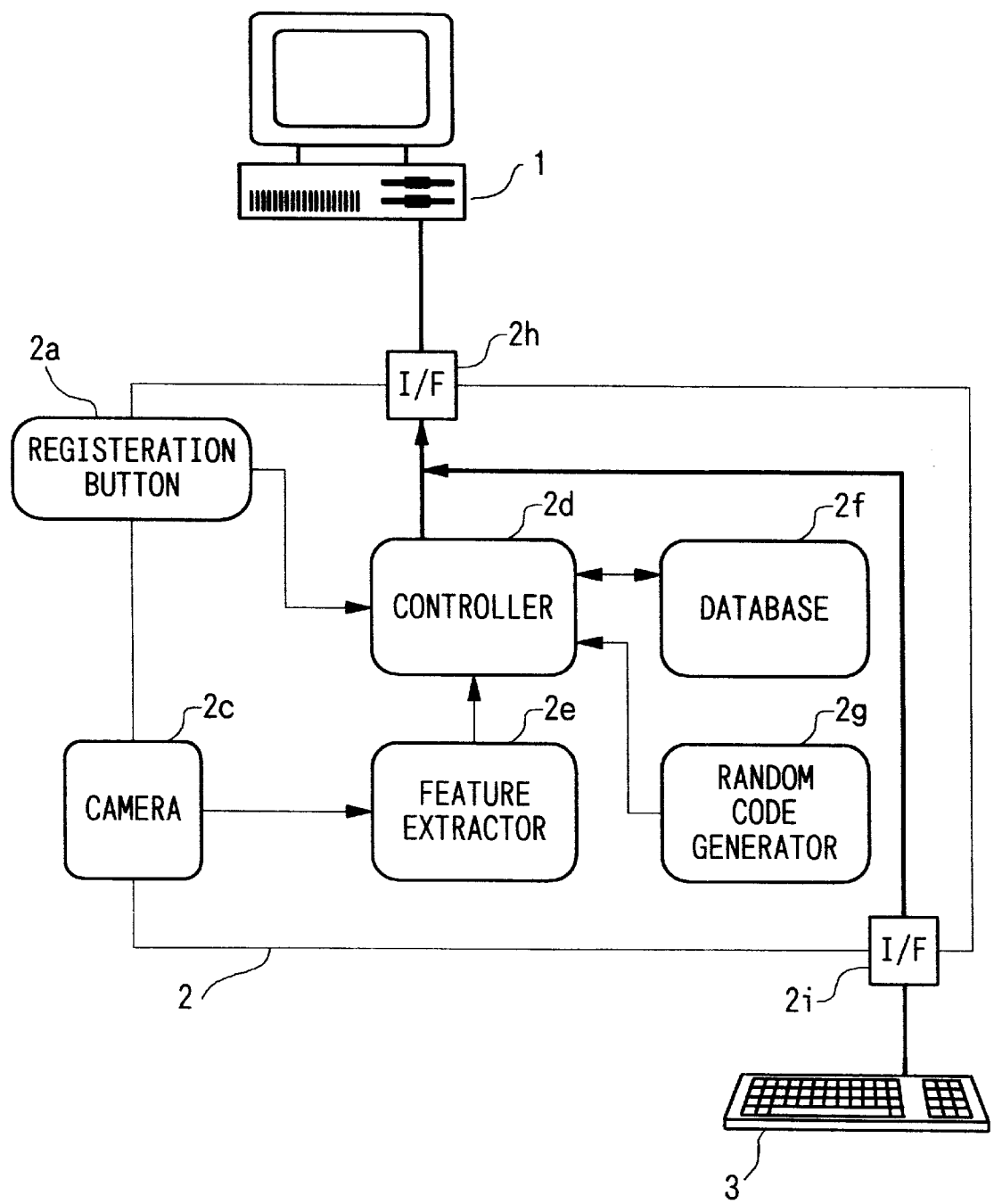
FIG. 1 is a block diagram showing a construction of a password input apparatus of a first embodiment of the present invention.

FIG. 1 is a block diagram showing a construction of the password input apparatus of a first embodiment according to the present invention. A system which includes the password input apparatus of the present invention is comprised of a computer 1, the password input apparatus 2 connected to a keyboard interface of the computer 1, and a keyboard 3 connected to the computer 1 via the password input apparatus 2.

The password input apparatus is comprised of a registration button 2a, a camera 2c, controller 2d, a feature extractor 2e, a database 2f, and a random code generator 2g. The registration button 2a is pushed down to register or change a fingerprint password. The camera 2c is, for example, a CCD (Charged Coupled Device) image sensor, which reads a fingerprint of a user placed thereon. The controller 2d is, for example, an MPU (Micro Processor Unit), which controls processes for registering the fingerprint password and for transmitting the password.

The feature extractor 2e is, for example, an MPU identical to the controller 2d or a special DSP (Digital Signal Processor), which extracts features (fingerprint minutiae) from the fingerprint read by the camera 2c. The database 2f is an SRAM (Static Random Access Memory) or an FROM (Flash Read Only Memory) for storing the feature data of the fingerprint and the password in a related manner. The random code generator 2g is comprised of software or firmware executed by the controller 2d, for generating random codes as a password.

The password input apparatus 2 includes an interface 2h for transmitting a password and an interface 2i for receiving an input from the keyboard 3. The interface 2h is connected to the interface of the computer 1 instead of the keyboard 3. The keyboard 3 is connected to interface 2i of the password input apparatus 2, which allows inputs from the keyboard 3 to transmit to the computer 1 as is, or is connected to the computer 1 in other appropriate manners. The keyboard 3 is not necessarily connected to the password input apparatus 2.

Figure 2:
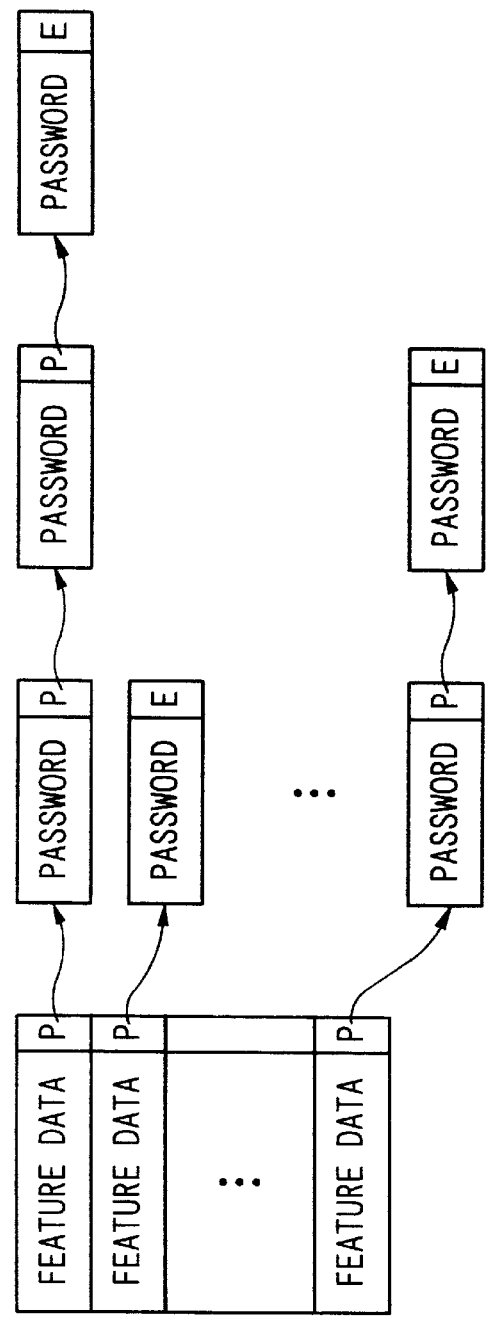
FIG. 2 is a diagram showing examples of feature data and passwords registered in a database of FIG. 1.

A USB (Universal Serial Bus) regulated general-purpose serial interface has been put into general use in recent years, and computers and keyboards compatible with the USB interface have been developed. Compatiblity of the password input apparatus 2 which may be provided with the USB interface is enhanced. Referring to FIG. 2, the database 2f stores the feature data and the password in a one-to-one manner.

An operation of the password input apparatus 2 of the first embodiment will be explained below.

When a user normally inputs a password, the user puts his finger on the camera 2c, at which point the feature extractor 2e extracts features of the fingerprint inputted from the camera 2c and the feature data are transmitted to the controller 2d.

The controller 2d reads the master password corresponding to the feature data from the database 2f, that is, using the feature data as a key, and sends the password via the interface 2h to the computer 1. When there is no corresponding feature data in the database 2f, nothing is sent.

When the registration button 2a is pushed down to register or change the master fingerprint password of the user, the controller 2d directs the random code generator 2g to generate random codes as a password. When the user places his finger on the camera 2c, the feature extractor 2e extracts features of the fingerprint and sends the feature data to the controller 2d.

The controller 2d registers the feature data and the password generated by the random code generator 2g in the database 2f in a related manner. When the feature data and the password have been registered, the old passwords is replaced by the new password.

Figure 3:
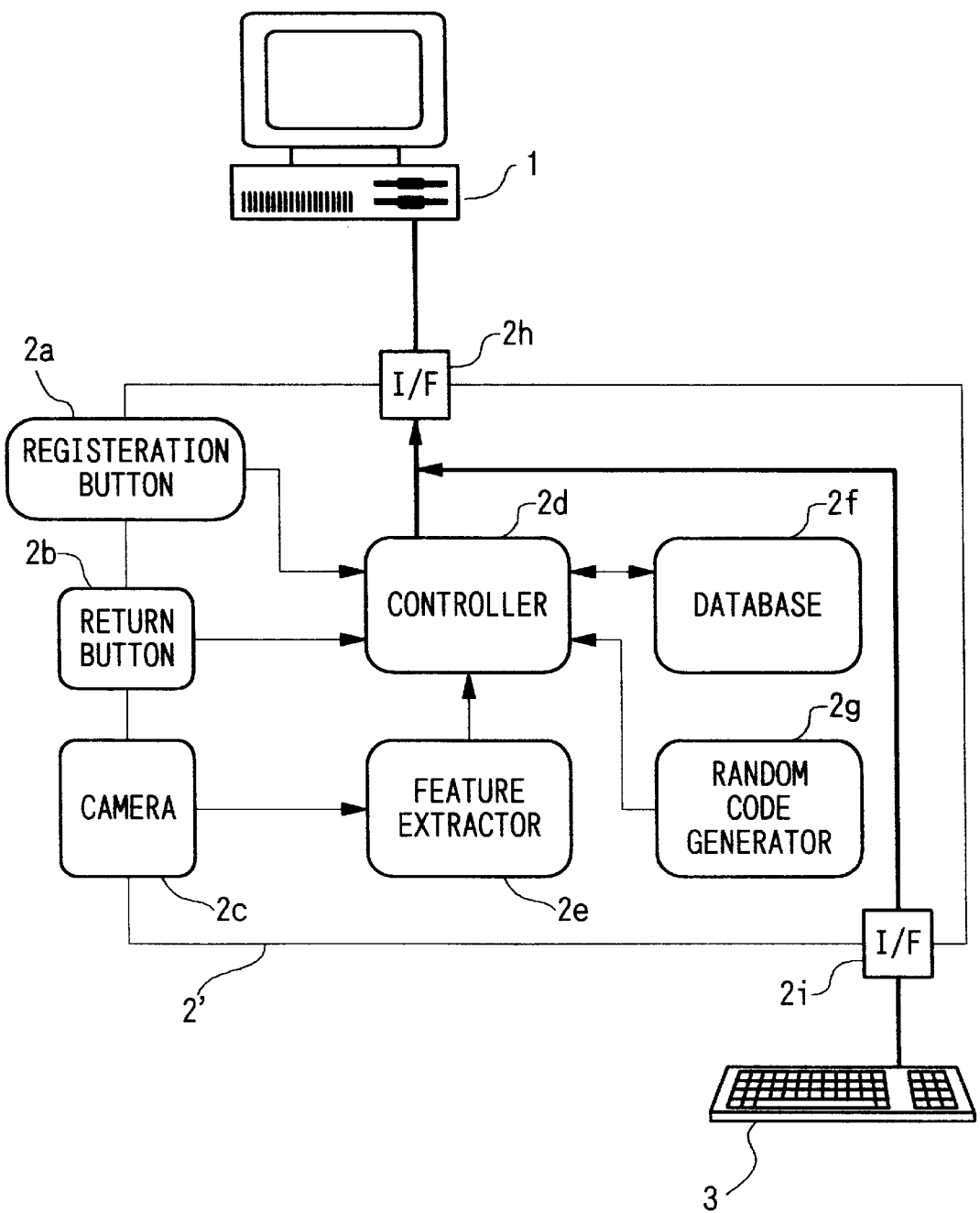
FIG. 3 is a block diagram showing a construction of a password input apparatus of a second embodiment of the present invention.

Referring to FIG. 3, a password input apparatus 2' of a second embodiment is further comprised of a return button 2b in addition to the construction of the password input apparatus 2 of the first embodiment. Reference numerals which are identical to those of the password input apparatus 2 of the first embodiment, respectively, indicate elements which are identical to those of the first embodiment; therefore, explanation thereof will be omitted.

Referring to FIG. 4, the database 2f stores a plurality of feature data, each of which is linked to more than one password by a pointer (chaining). The old passwords can be successively obtained by tracing the links from the feature data.

When a password registered in the past is desired, the user pushes down the return button 2b when inputting the password, and placed his finger on the camera 2c, at which point the feature extractor 2e extracts features of the inputted fingerprint, and the controller 2d reads the newest password in the group of the passwords registered with the feature data in a related manner and sends it to the computer 1. When no password is registered in the database 2f, nothing is sent.

When the second password from the newest one is desired, the second password can be obtained as well as the first newest password by twice pushing down the return button 2b. Although in the embodiments the host device is a computer 1, the host device is not limited to a computer.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A password input apparatus comprising:

a database for storing feature data of a previously registered master fingerprint and a password of an authorized user in a related manner;

a camera for obtaining a fingerprint being inputted from said user's finger;

an extractor for extracting feature data of said fingerprint;

a controller for reading said password from said database based on said feature data extracted by said extractor; and an interface for outputting said password to another device.

2. A password input apparatus according to claim 1, further comprising:

a registration commander for requiring registration of a new password; and a random code generator for generating a random code as a new password when commanded by said registration command device, wherein said controller stores said new password and said feature data extracted by said extractor in a related manner to each other in said database when registration is commanded by said registration commander, said controller reading said password from said database based on said feature data extracted by said extractor when registration is not commanded by said registration commander.

3. A password input apparatus according to claim 1, wherein said interface outputs said password when said fingerprint matches with said previously registered master fingerprint.

4. A password input apparatus according to claim 1, wherein said database stores a plurality of passwords for one authorized user in generation order.

5. A password input apparatus according to claim 4, further comprising a selection means for selecting one of said passwords.

6. A password input apparatus according to claim 1, wherein said interface is a keyboard interface connected between a keyboard and said device.

7. A password input apparatus according to claim 1, wherein said interface is a USB interface.

* * * * *